(12) United States Patent
Chou

(10) Patent No.: US 6,219,924 B1
(45) Date of Patent: Apr. 24, 2001

(54) AIR BAG BUFFER DEVICE FOR HAND TOOL

(76) Inventor: Hwei-Rung Chou, 8 F. No. 341, Sec 4 Sinyi Rd., Taipei (TW)

(*) Notice: Subject to any disclaimer, the term of this patent is extended or adjusted under 35 U.S.C. 154(b) by 0 days.

(21) Appl. No.: 09/515,618

(22) Filed: Feb. 29, 2000

(51) Int. Cl.⁷ .................................................. B26B 13/00
(52) U.S. Cl. .............................................. 30/271; 81/427.5
(58) Field of Search ............................. 30/271, 254, 261, 30/262; 81/427.5

(56) References Cited

U.S. PATENT DOCUMENTS

| | | | |
|---|---|---|---|
| 2,727,304 | * 12/1955 | Kulbersh | 30/271 |
| 2,979,862 | * 4/1961 | Tacderan | 30/271 |
| 4,078,307 | * 3/1978 | Zavala | 30/271 |
| 5,592,743 | * 1/1997 | Labarre et al. | 30/271 |

* cited by examiner

Primary Examiner—Douglas D. Watts
(74) Attorney, Agent, or Firm—Varndell & Varndell, PLLC

(57) ABSTRACT

An air bag buffer device for a hand tool comprises a hollow bag and a plug. The front end of the hollow bag is a hollow and sealed snake-like tube. At the center of one end of the snake-like tube is formed with a round post. The center of the round post has an axial helical hole, and the helical hole is communicated with the interior of the snake-like tube. The plug is formed as a helical post, the center of which is an axial air hole, the front end of the air hole formed with a unidirectional elastic valve piece which is closed in the front end. Thereby, the front end of the plug is screwedly inserted into the helical hole of the round post of the hollow bag so that the buffer device is firmly secured to one handle or two handles of a hand tool. As the hand tool applies a force, the impact from closing two handles are reduced to resist the opening of the two handles for being used again.

7 Claims, 7 Drawing Sheets

AIR BAG BUFFER DEVICE FOR HAND TOOL

FIELD OF THE INVENTION

The present invention relates to an air bag buffer device for a hand tool comprising a hollow bag having a snake-like tube and a plug, which is especially suitable for being used in gardening clippers or clippers. An air bag buffer device is installed at the inner side of the handle of a hand tool for absorbing the impact force from closing two handles and the react shock as the hand tool applied a force can also be absorbed. By elasticity, the handles can restore to the original state rapidly for being operated again.

BACKGROUND OF THE INVENTION

Conventional hand tools, such as gardening tools or clippers, can be classified into two types, one with long handles and the other with short handles. For example, for a gardening clippers, no matter having long handles or short handles, as the handles clamp a branch to be cut, a resisting force will generate so that the user must apply a larger force for cutting the branch. While at the moment that the branch is cut, the handles will close instantly due to the resisting force disappears, and thus the handles will collide with one another. For a long period of time, not only the gardening clippers are possible destroyed, moreover, as the user works for a long time, due to the react shocks from branches, the user will feel ache at the waists and hands.

Therefore, in general, shock-proof blocks are installed at the inner sides of the handles of the gardening clippers for reducing the impact force between the two handles. However, in general, the shock-proof is made of solid plastic and rubber with a small deformation as it is compressed. Namely, the margin for elastic deformation is very smaller. Therefore, they can not effectively absorb reacting shock or vibration. Thus, the defect in the prior art can not be solved completely.

SUMMARY OF THE INVENTION

Accordingly, the primary object of the present invention is to provide an air bag buffer device for a hand tool comprising a hollow bag having a snake-like tube and a plug. Therefore, by compressing air, a damping effect is formed. Thereby, the buffer device can be installed at the inner side of a handle for absorbing the impact force from closing two handles and the react shock as the hand tool applied a force can also be absorbed. Therefore, the users will not be hurt due to a long period of using the hand tool.

Another object of the present invention is to provide an air bag buffer device of a hand tool, as two handles of a hand tool are closed, by elasticity of the air bag buffer device, two handles can be separated for being used again.

A further object of the present invention is to provide an air bag buffer device for a hand tool, wherein at least one air groove is installed at an outer wall of the air bag buffer device, thereby, the air bag buffer device can be assembled to the handles. By the air groove, air can flow into the buffer device so that as the buffer device is compressed, a damping force is generated and thus the impact force is reduced.

The various objects and advantages of the present invention will be more readily understood from the following detailed description when read in conjunction with the appended drawing.

DETAILED DESCRIPTION OF THE PREFERRED EMBODIMENTS

Figure 1:
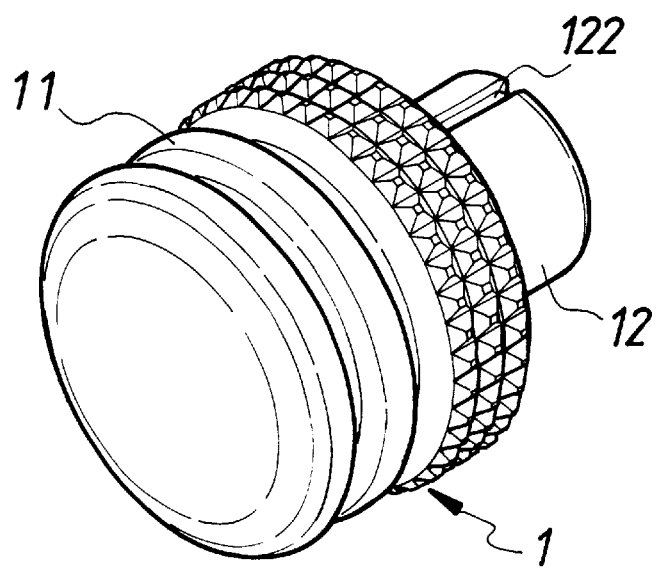
FIG. 1 is a perspective view of the buffer device in the present invention.
Figure 2:
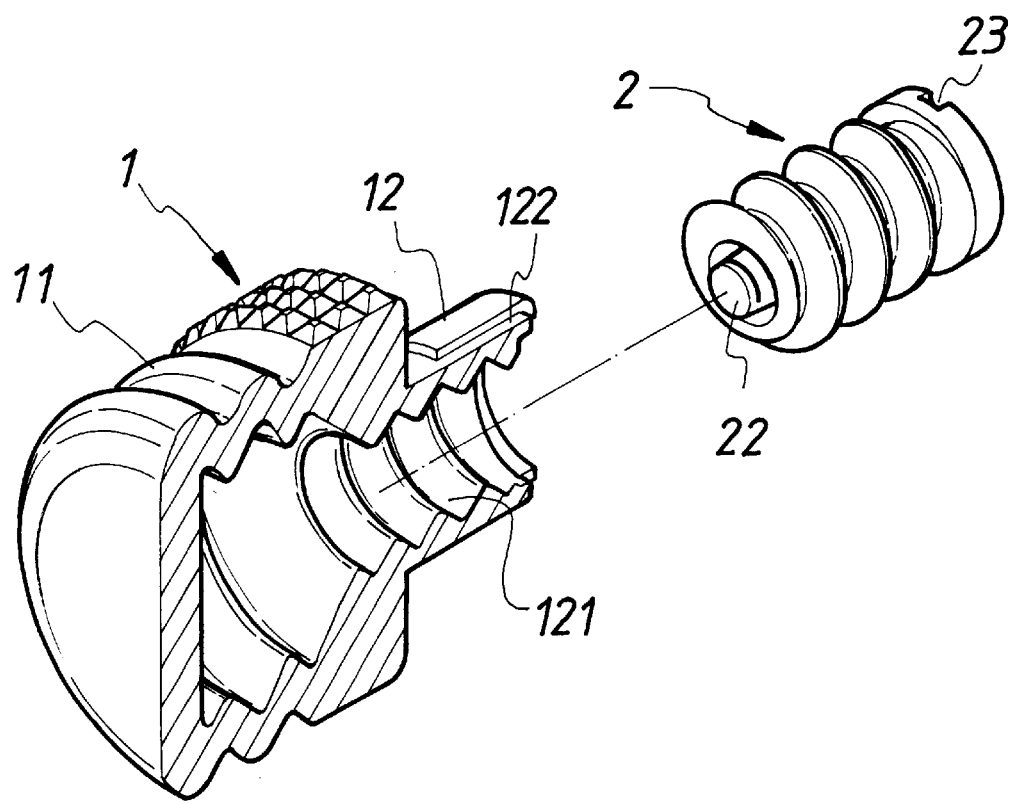
FIG. 2 is an exploded perspective view of the buffer device in the present invention.

As shown in FIGS. 1 and 2, the air bag buffer device for a hand tool according to the present invention is illustrated, which is a general used hand tool, gardening tool, or clipping tool. Herein, gardening clippers are used an example. However, it is used as a preferred embodiment while not to confine the scope and spirit of the present invention defined in the appended claims. The air bag buffer device for a hand tool of the present invention includes a hollow bag 1 and a plug 2.

The hollow bag 1 is made of soft and elastic materials, such as rubber or plastics. The front end thereof is a hollow and sealed snake-like tube 11. At the center of one end of the snake-like tube 11 is formed with a round post 121. The center of the round post 12 has an axial helical hole 121. The helical hole 121 is communicated with the interior of the snake-like tube 11. The periphery of the round post 12 has one or more axial air grooves 122. The air groove 122 is extended to the end portion of the round post 12 to be communicated with the helical hole 121.

The plug 2 is made of soft and elastic materials, such as rubber or plastics. The plug 2 is formed as a helical post, the center of which is an axial air hole 21. The front end of the air hole 21 is formed with a unidirectional elastic valve piece 22 which is closed in the front end. The rear side of the plug 2 has at least one radial air groove 23.

Figure 3:
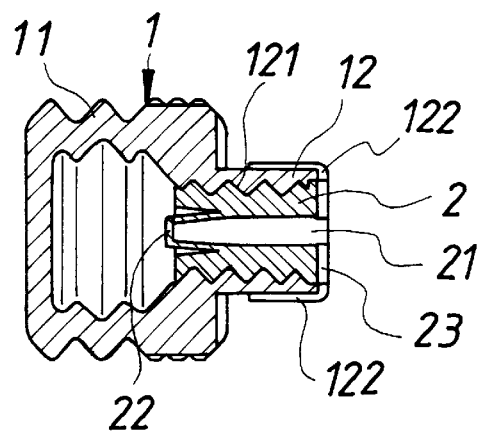
FIG. 3 is an assembled cross sectional view showing the buffer device in the present invention.
Figure 4:
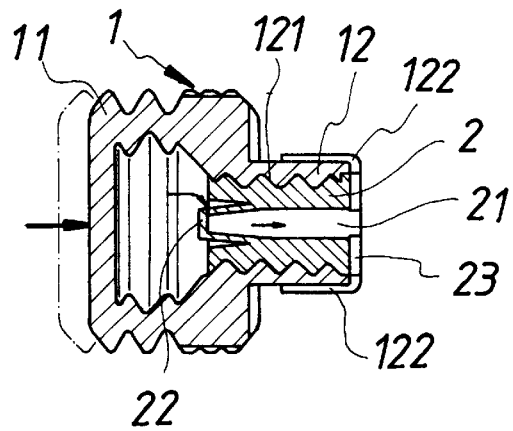
FIG. 4 is a schematic view showing the compressing state of the buffer device in the present invention.
Figure 5:
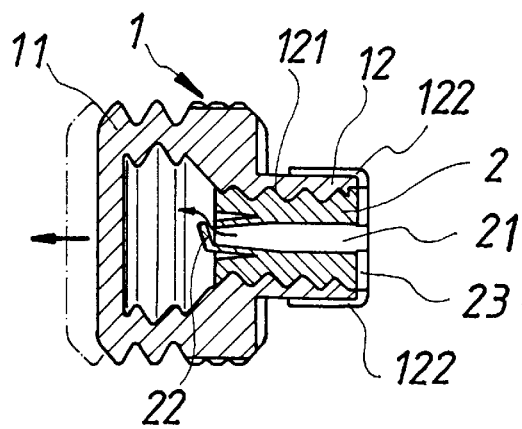
FIG. 5 is a schematic view showing the restoration of the buffer device in the present invention.
Figure 6:
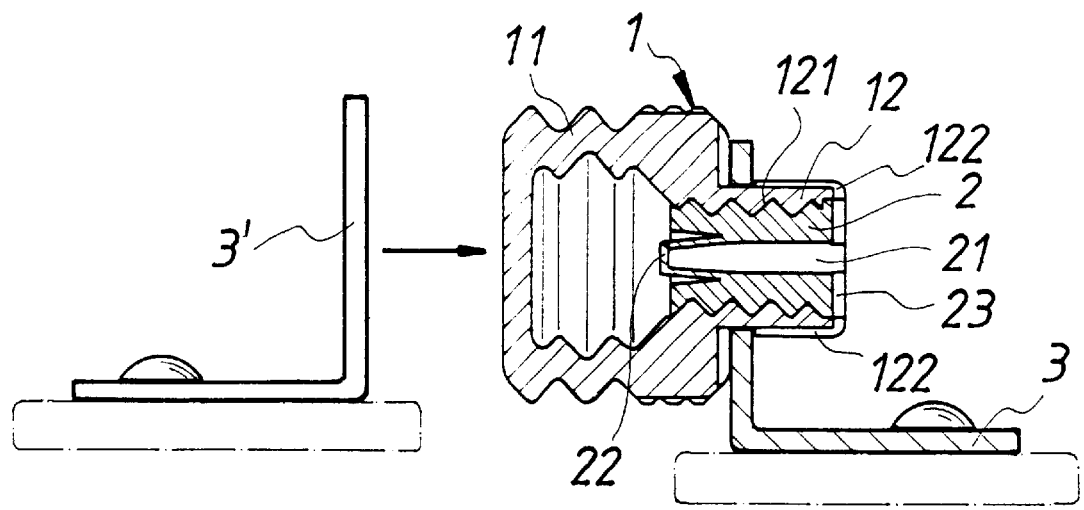
FIG. 6 is a schematic view showing the compressing buffer of a L shape fixing piece in the present invention.

By the aforesaid hollow bag 1 and the plug 2, the front end of the plug 2 is screwedly inserted into the helical hole 121 of the round post 12 of the hollow bag 1 so that the elastic valve piece 11 of front end of the plug 2 is exactly positioned in the snake-like tube 11 of the hollow bag 1. The air groove 23 at rear end of the plug 2 is exactly communicated with the air groove 122 extending from the end portion of the round post 12 (as shown in FIG. 3). Thereby, when the front end of the snake-like tube 11 of the hollow bag 1 is squeezed, since the elastic valve piece 22 seals the air hole 21 unidirectionally, a damping effect is formed so that the interior air is drained slowly (as shown in FIG. 4). As the squeezing force is released, at the time that the snake-like tube 11 is restored elastically, the outer air is absorbed from the helical hole 21 of the plug 2 and then passes through the elastic valve piece 22 to enter into the snake-like tube 11 (as shown in FIG. 5). As it is squeezed, the air bag buffer device for a hand tool of the present invention is further generated a damping effect.

Figure 8:
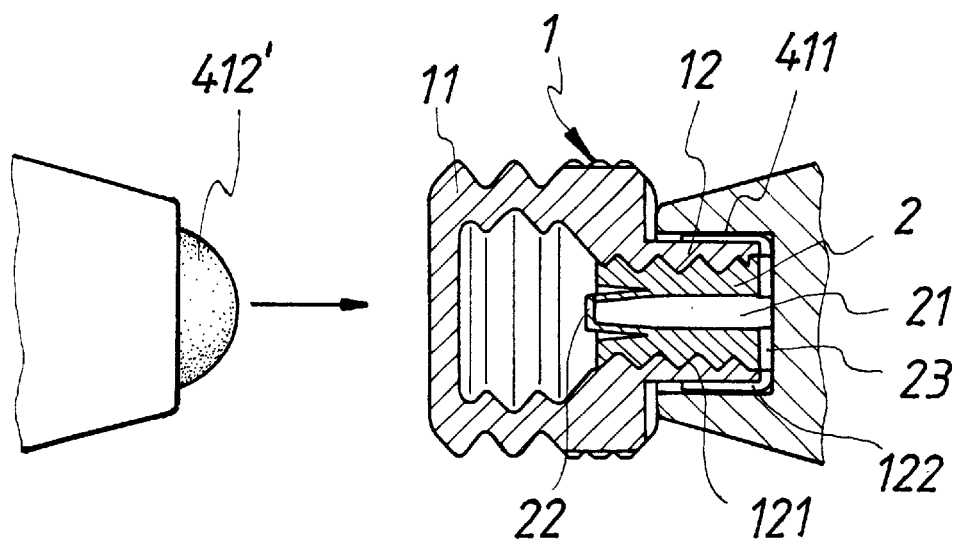
FIG. 8 is a schematic view showing the protrusion according to the present invention compressing the buffer device.
Figure 7:
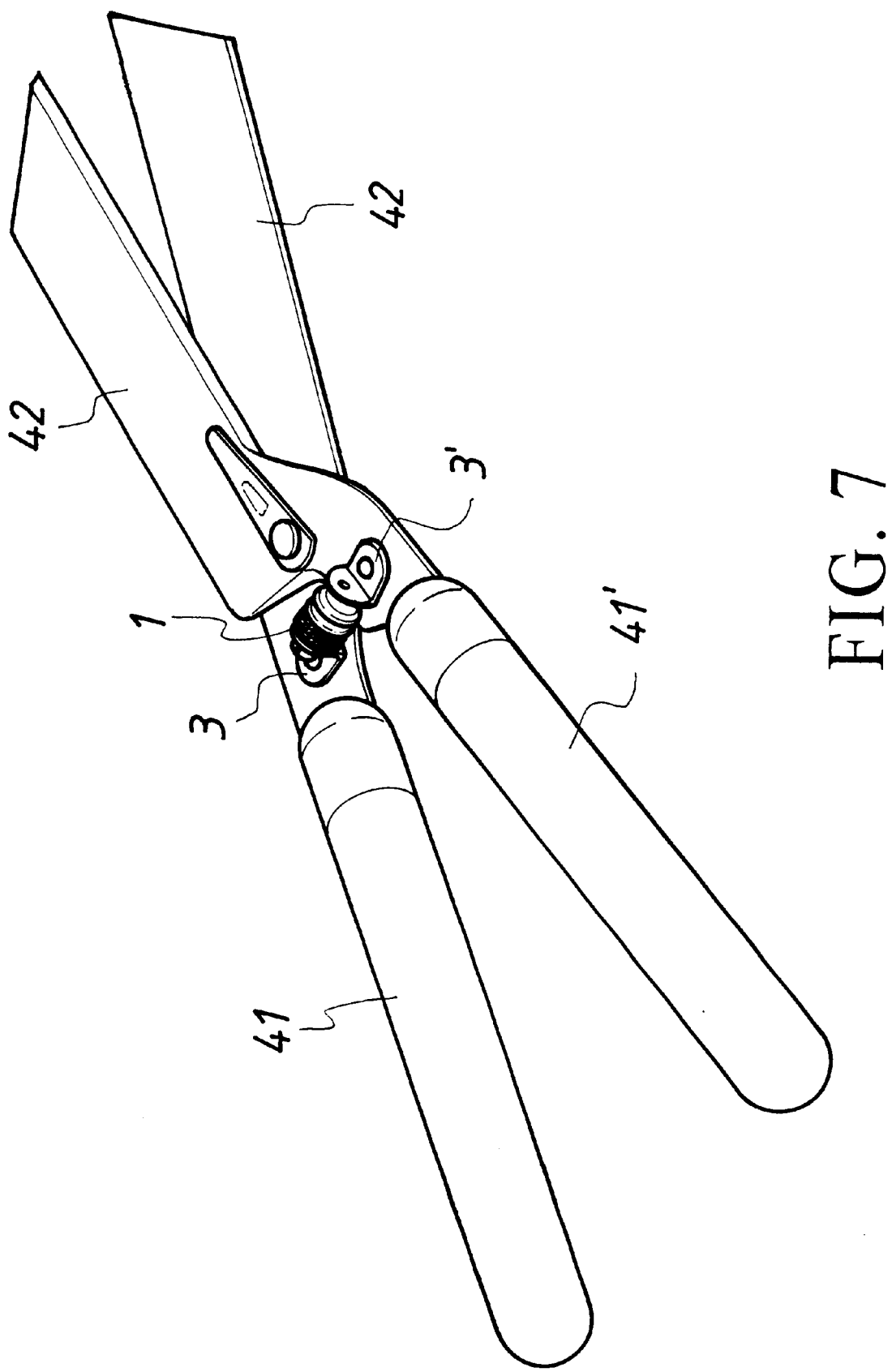
FIG. 7 is a schematic view showing the L shape fixing piece of the present invention being assembled to a gardening clippers.

Therefore, as shown in FIGS. 7 and 8, an L shape fixing piece 3 can enclose the periphery of the round post 12 of the hollow bag 1. While another side of the L shape fixing piece 3 is firmly secured to the surface of one handle 41 of the gardening clippers 4 so that the hollow bag 1 faces inwards. At a position of the handle 41' identical to that at the hollow bag 41 is firmly installed with an L shape fixing piece 3' so that as two handles 41 of the gardening clippers 4 are closed, the L shape fixing piece 3' exactly resists against the front end of the hollow bag 1.

Figure 9:
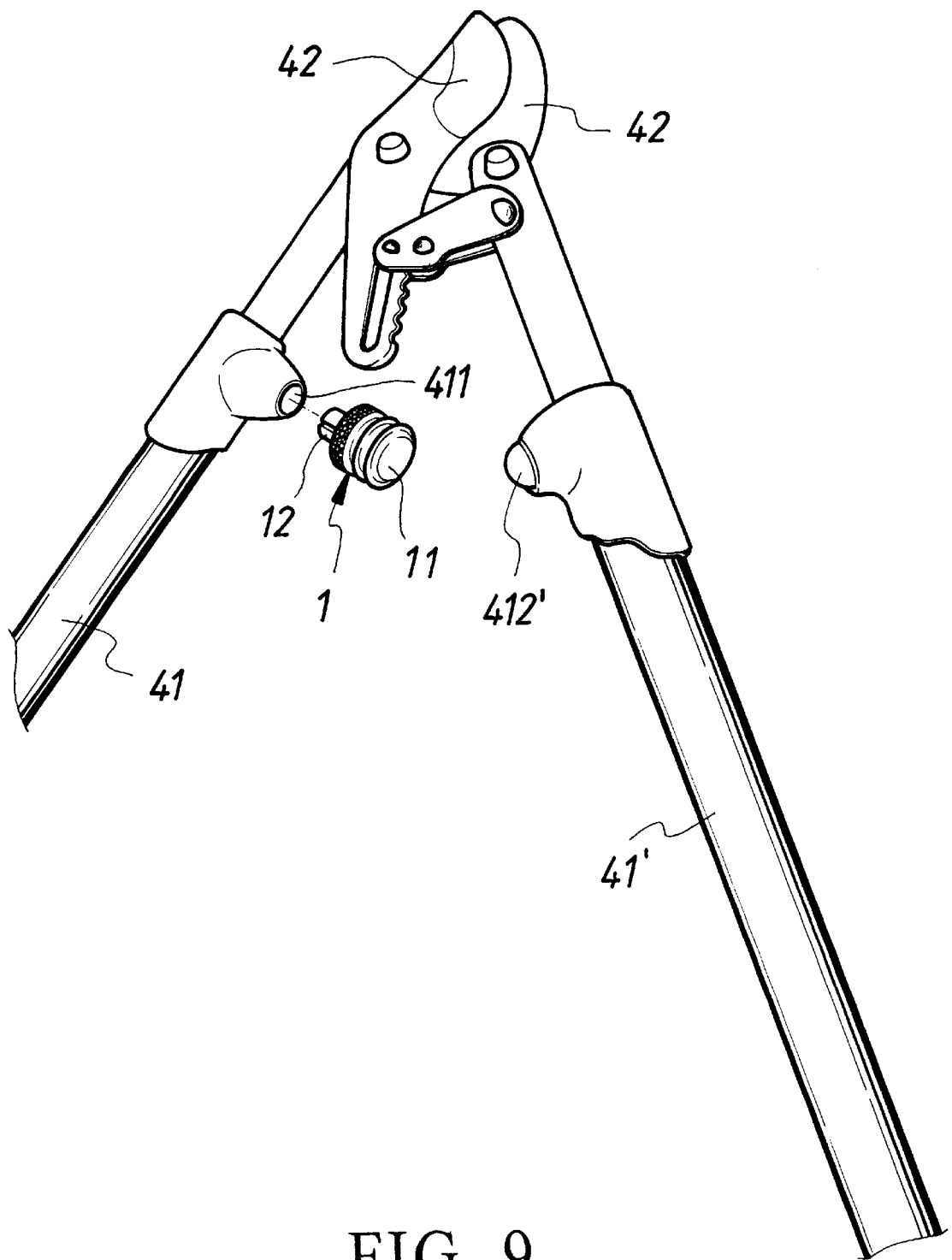
FIG. 9 is a schematic view showing the buffer device of the present invention being inserted into the handle of a gardening clippers.

Moreover, as shown in FIGS. 8 and 9, a hole 411 can be installed at the inner side of the handle 41 of the gardening clippers 4. At the same position of another handle 41' is formed with a protrusion 412'. Thereby, as the rear end of the hollow bag 1 is inserted into the hole 411 of the round post 12 so that the air bag buffer device of the present invention can be fixedly combined with the handle 41. When two handles 41 and 41' are closed, the protrusion 412' may resist against the front end of the hollow bag 1.

The advantages of the present invention will be described in the following. When a user cuts a branch by the gardening clippers 4 of the present invention, the user can hold the two handles 41 and 41' of the gardening clippers 4, two knives 42 at the front end of the gardening clippers clamps the portion of the branch to be cut, and then naturally, a react force is generated to resist against the cutting force of the gardening clippers 4. When the user applies a force to cut the branch, two handles 41 and 41' can be closed rapidly, namely, the L shape fixing piece 3' or protrusion 412' of the handle 41' will contact with the end portion of the hollow bag 1 of the buffer device in advance, and then the air within the hollow bag 1 is further compressed. Since the elastic valve piece 22 seals the air hole 21 unidirectionally, thus, a small amount of air will drain out slowly. By damping effect, the impact from closing the two handles 41 and 41' can be absorbed rapidly, moreover, the react shock from a force being applied to the branch also absorbs. Thereby, the serious collision from the two handles 41 and 41' can be prevented effectively, and the hurt of the hand due to buffer the react shock is also prevented.

Moreover, in general, gardening clippers have the function of automatic restoration, therefore, the hollow bag 1 in the buffer device of the present invention is formed as a snake-like tube 11. And, it is made of elastic material. Therefore, as the gardening clippers are released, by the elastic restoring force at the snake-like tube 11 in front of the hollow bag 1, the handle 41 ' can be pushed away so that the two handles 41 and 41' restores to an opening state. However, as the snake-like tube 11 is restored, outer air can be absorbed from the air hole 21 of the plug 2 so that air pushes away the elastic valve piece 22 to be positioned in the hollow bag 1 so that the two handles 41 and 41 ' can close again for absorbing the impact force. Thus, the buffer device of the present invention not only absorbs the impact force, and further, the gardening clippers 4 is further opened.

Figure 10:
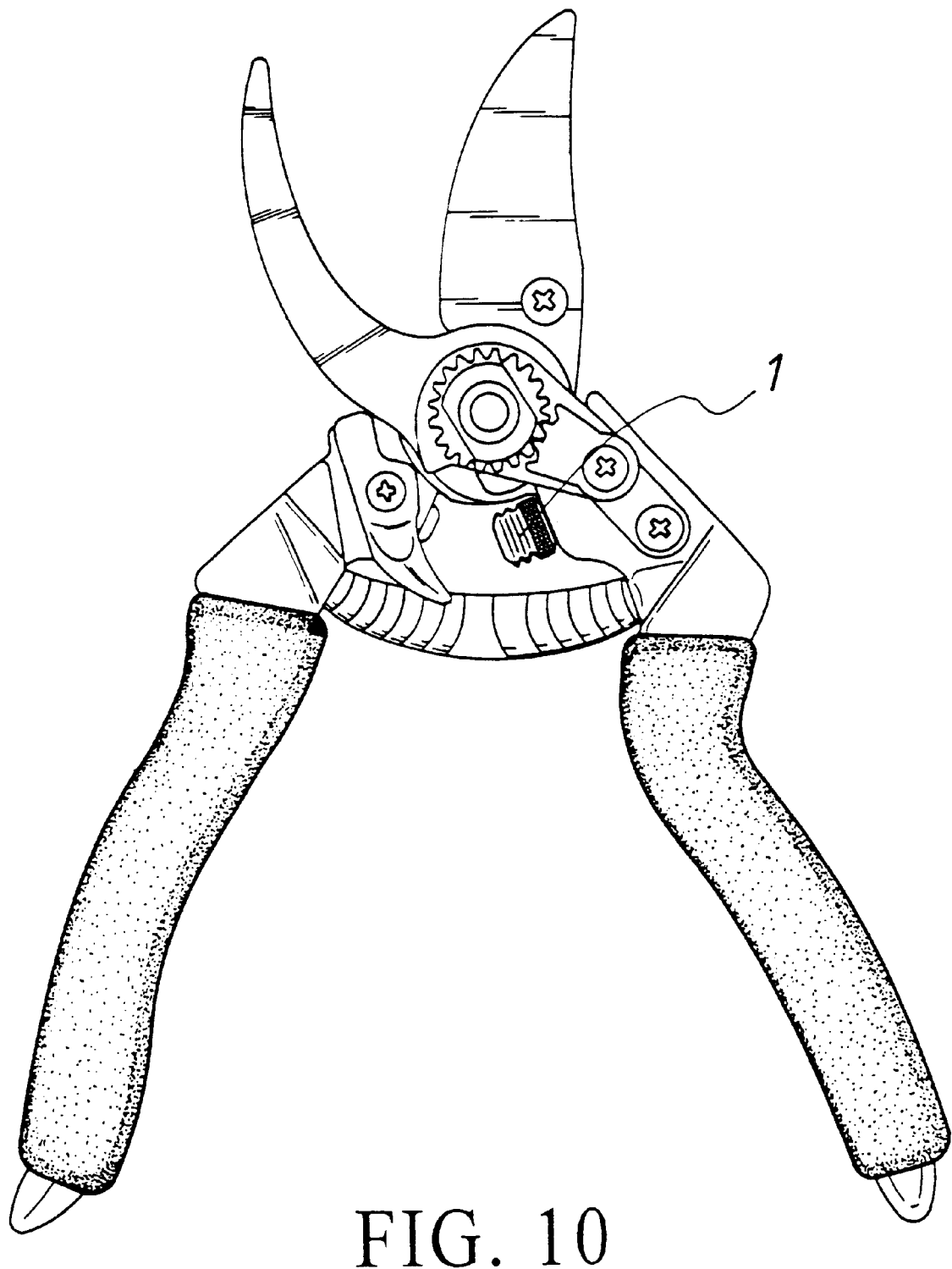
FIG. 10 is a schematic view showing the buffer device of the present invention being embodied in a gardening clippers with a short handle.
Figure 11:
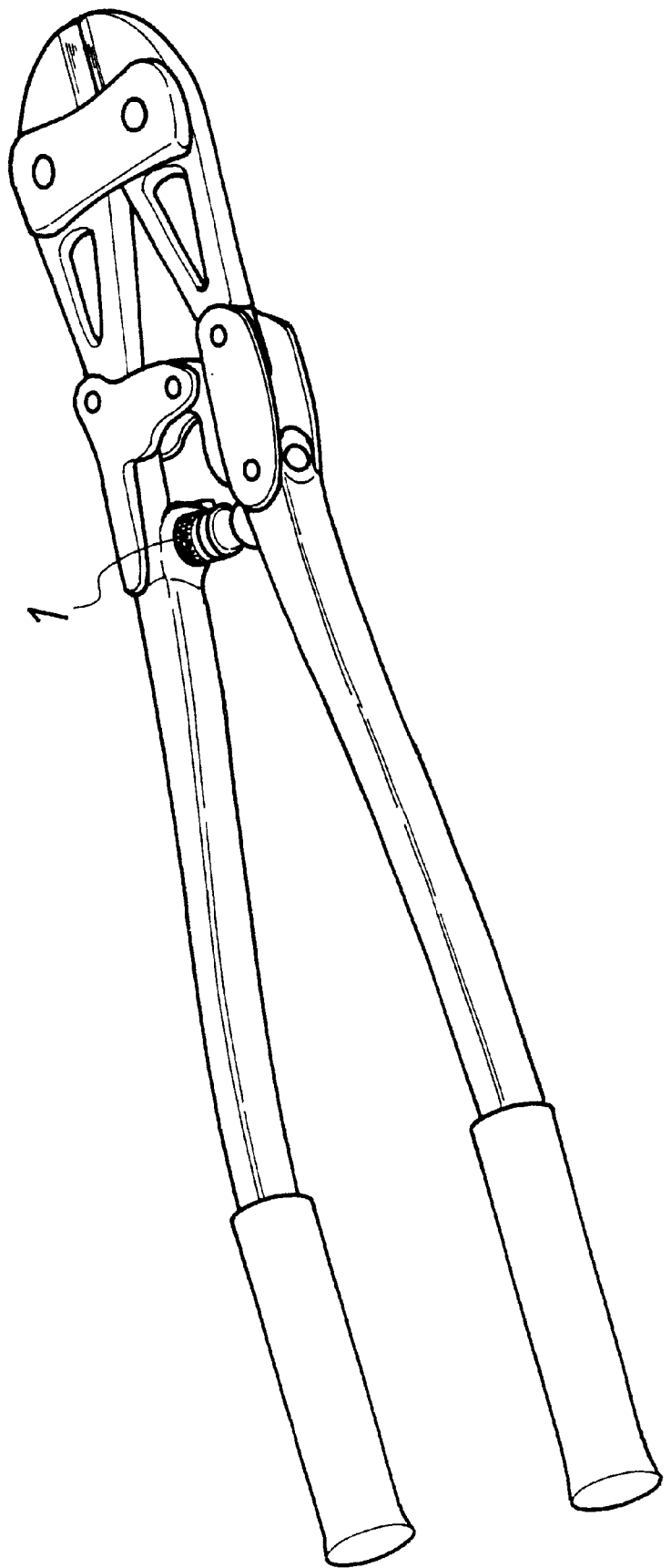
FIG. 11 is a schematic view showing the embodiment that the buffer device of the present invention being embodied by clippers.

In above description, gardening clippers with long handles are used to embodied in the air bag buffer device for a hand tool of the present invention. However, the present invention can be used in other hand tools, gardening tools, or other clippers (as shown in FIG. 10) to achieve a predict effect.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An air bag buffer device for a hand tool, an air bag buffer device being installed the handles of the hand tool, the air bag buffer device comprising a hollow bag and a plug, wherein the hollow bag is made of soft and elastic materials, such as rubber or plastics, a front end thereof is a hollow and sealed snake-like tube, at a center of one end of the snake-like tube is formed with a round post, a center of the round post has an axial helical hole, the helical hole is communicated with an interior of the snake-like tube;

the plug is made of soft and elastic materials, such as rubber or plastics, the plug is formed as a helical post, a center of which is an axial air hole, a front end of the air hole formed with a unidirectional elastic valve piece which is closed in the front end;

wherein, a front end of the plug is screwedly inserted into the helical hole of the round post of the hollow bag so that the elastic valve piece of a front end of the plug is exactly positioned in the snake-like tube of the hollow bag, therefore, an air bag buffer device with damping effect is formed; the buffer device is firmly secured to one handle or two handles of a hand tool so that impact from closing two handles are reduced to resist the separation of the two handles.

2. The air bag buffer device for a hand tool as claimed in claim 1, wherein the periphery of the round post has one or more axial air grooves; the air groove is extended to the end portion of the round post to be communicated with the helical hole; the rear side of the plug has at least one radial air groove; as the plug is screwedly installed in the hollow bag, the air groove at the round post is communicated with the plug.

3. The air bag buffer device for a hand tool as claimed in claim 1, wherein an L shape fixing piece encloses the periphery of the round post of the hollow bag, while another side of the L shape fixing piece is firmly secured to one handle of the gardening clippers so that the hollow bag faces inwards, another handle is firmly installed with an L shape fixing piece so that as two handles of the gardening clippers are closed, the L shape fixing piece exactly resists against the front end of the hollow bag.

4. The air bag buffer device for a hand tool as claimed in claim 1, wherein a hole is installed at the inner side of one handle, while the inner side of another handle is installed with a protrusion, the round post in the hollow bag of the buffer device is inserted into the hole of one handle so that the protrusion of another handle resists against the buffer device to absorb the impact force.

5. The air bag buffer device for a hand tool as claimed in claim 1, wherein the hand tool is a gardening tool.

6. The air bag buffer device for a hand tool as claimed in claim 1, wherein the hand tool is clippers.

7. The airbag buffer device for a hand tool as claimed in claim 2, wherein a hole is installed at the inner side of one handle, while the inner side of another handle is installed with a protrusion, the round post in the hollow bag of the buffer device is inserted into the hole of one handle so that the protrusion of another handle resists against the buffer device to absorb the impact force.

* * * * *